(12) United States Patent
Parry et al.

(10) Patent No.: US 10,970,170 B2
(45) Date of Patent: Apr. 6, 2021

(54) SHARED PARITY PROTECTION

(71) Applicant: Micron Technology, Inc., Boise, ID (US)

(72) Inventors: Jonathan Scott Parry, Boise, ID (US); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 29 days.

(21) Appl. No.: 16/555,014

(22) Filed: Aug. 29, 2019

(65) Prior Publication Data

US 2021/0064468 A1 Mar. 4, 2021

(51) Int. Cl.
*G06F 11/10* (2006.01)
*G06F 3/06* (2006.01)

(52) U.S. Cl.
CPC ........ *G06F 11/1076* (2013.01); *G06F 3/0604* (2013.01); *G06F 3/0647* (2013.01); *G06F 3/0659* (2013.01); *G06F 3/0679* (2013.01); *G06F 11/108* (2013.01); *G06F 11/1068* (2013.01); *G06F 11/1072* (2013.01)

(58) Field of Classification Search
CPC .. G06F 11/1076; G06F 3/0604; G06F 3/0647; G06F 3/0659; G06F 3/0679; G06F 11/108; G06F 11/1068; G06F 11/1072
USPC ........ 714/800, 763, 766, 768, 769, 773, 799
See application file for complete search history.

(56) References Cited

U.S. PATENT DOCUMENTS

| | | | | |
|---|---|---|---|---|
| 6,631,493 | B2* | 10/2003 | Ottesen | G06F 3/0601 360/53 |
| 9,229,809 | B2* | 1/2016 | Moss | G06F 11/1471 |
| 10,289,489 | B2* | 5/2019 | Chaghooshi | G06F 3/067 |
| 10,459,793 | B2* | 10/2019 | Bandic | G06F 11/108 |
| 10,656,995 | B2* | 5/2020 | Cariello | G11C 29/52 |
| 2002/0156973 | A1* | 10/2002 | Ulrich | G06F 11/1076 711/114 |

(Continued)

OTHER PUBLICATIONS

Pan et al., SPD-RAID4: Splitting Parity Disk for RAID4 Structured Parallel SSD Arrays, 2013, IEEE, pp. 9-16. (Year: 2013).*

(Continued)

*Primary Examiner* — John J Tabone, Jr.
(74) *Attorney, Agent, or Firm* — Schwegman Lundberg & Woessner, P.A.

(57) ABSTRACT

A variety of applications can include apparatus and/or methods that provide shared parity protection to data in memory devices of a memory system. Parity data of different data streams programmed into different blocks of one or more memory devices can be overlapped and wrapped into slots of a volatile memory arranged as a storage device for the parity data. A parity map of parity-to-data reflecting the overlapping of the parity data can be maintained in the volatile memory along with the overlapped parity. The parity map can be updated as parity data is generated from further programming of the data streams. The parity contents of the volatile memory, including the parity map, can be transferred to a non-volatile memory in response to a determination of an occurrence of a transfer criterion. The parity contents flushed to the non-volatile memory can be used to allow correct data reconstruction in case of failures in programming.

24 Claims, 13 Drawing Sheets

(56) References Cited

U.S. PATENT DOCUMENTS

| | | | |
|---|---|---|---|
| 2013/0067174 A1* | 3/2013 | Moss | G06F 11/1471 |
| | | | 711/154 |
| 2015/0378816 A1* | 12/2015 | Kawamura | G06F 11/1096 |
| | | | 714/766 |
| 2016/0004596 A1* | 1/2016 | D'Abreu | G06F 11/108 |
| | | | 714/773 |
| 2016/0274791 A1* | 9/2016 | Song | G06F 3/0679 |
| 2017/0269992 A1* | 9/2017 | Bandic | G06F 11/108 |
| 2019/0018734 A1* | 1/2019 | Chaghooshi | G06F 11/1076 |
| 2019/0065331 A1* | 2/2019 | Singidi | G06F 11/1068 |
| 2019/0266046 A1* | 8/2019 | Bahirat | G06F 11/108 |
| 2019/0392918 A1* | 12/2019 | Cariello | G11C 29/028 |
| 2020/0004453 A1* | 1/2020 | Rori | G06F 3/0652 |
| 2020/0005880 A1* | 1/2020 | Cariello | G11C 16/14 |
| 2020/0110660 A1* | 4/2020 | Cariello | G06F 11/1068 |
| 2020/0110661 A1* | 4/2020 | Singidi | G06F 3/0659 |
| 2020/0210067 A1* | 7/2020 | Cariello | G11C 16/10 |
| 2020/0210283 A1* | 7/2020 | Palmer | H03M 13/2906 |
| 2020/0293401 A1* | 9/2020 | Lee | G06F 3/0659 |

OTHER PUBLICATIONS

Hsieh et al., Configurable Reliability Framework for SSD-RAID, 2014, IEEE, pp. 1-6. (Year: 2014).*

* cited by examiner

| | | | |
|---|---|---|---|
| T0⊗T24⊗S0 | T6⊗S6 | T12 | T18 |
| T1⊗T25⊗S1 | T7⊗S7 | T13 | T19 |
| T2⊗T26⊗S2 | T8⊗S8 | T14 | T20 |
| T3⊗S3 | T9⊗S9 | T15 | T21 |
| T4⊗S4 | T10⊗S10 | T16 | T22 |
| T5⊗S5 | T11⊗S11 | T17 | T23 |

| | | | |
|---|---|---|---|
| T27⊗S11⊗S35 | S17 | S23 | S29 |
| T28⊗S12⊗S36 | S18 | S24 | S30 |
| T29⊗S13⊗S37 | S19 | S25 | S31 |
| S14⊗S38 | S20 | S26 | S32 |
| S15 | S21 | S27 | S33 |
| S16 | S22 | S28 | S34 |

| | | COUNT | PHYSICAL ADDRESS | | 761 |
|---|---|---|---|---|---|
| | 0 | T0 | T24 | S0 | |
| | 1 | T1 | T25 | S1 | |
| | 2 | T2 | T26 | S2 | |
| | 3 | T3 | S3 | | |
| | 4 | T4 | S4 | | |
| | 5 | T5 | S5 | | |
| | 6 | T6 | S6 | | |
| | 7 | T7 | S7 | | |
| | 8 | T8 | S8 | | |
| | 9 | T9 | S9 | | |
| PARITY SLOT | 10 | T10 | S10 | | |
| | 11 | T11 | S11 | | |
| | 12 | T12 | | | |
| | 13 | T13 | | | |
| | 14 | T14 | | | |
| | 15 | T15 | | | |
| | 16 | T16 | | | |
| | 17 | T17 | | | |
| | 18 | T18 | | | |
| | 19 | T19 | | | |
| | 20 | T20 | | | |
| | 21 | T21 | | | |
| | 22 | T22 | | | |
| | 23 | T23 | | | |

FIG. 7A

| PAGE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | T1⊕T24⊕S0 | T1⊕T25⊕S1 | T1⊕T26⊕S2 | T3⊕S3 | T4⊕S4 | T5⊕S5 | T6⊕S6 | T7⊕S7 | T8⊕S8 | T9⊕S9 | T10⊕S10 | T11⊕S11 | T12 | T13 | T14 | T15 |
| 1 | T16 | T17 | T18 | T19 | T20 | T21 | T22 | T23 | PARITY MAP — 761 | OTHER SYNC DATA | | | | | | |

PLANES

SHARED PARITY PROTECTION

FIELD OF THE DISCLOSURE

Embodiments of the disclosure relate generally to memory systems, and more specifically, related to management of parity data protection in memory systems.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

BRIEF DESCRIPTION OF THE DRAWINGS

The drawings, which are not necessarily drawn to scale, illustrate generally, by way of example, but not by way of limitation, various embodiments discussed in the present document.

FIGS. 6A-6D illustrate an example of sharing parity data from multiple blocks, where the blocks are for different types of data programmed, according to various embodiments.

FIGS. 7A-7B illustrate an example of a parity map of a volatile memory and a page-plane allocation of an associated nonvolatile memory to which the parity map can be flushed from the volatile memory along with parity data corresponding to the parity map, according to various embodiments.

DETAILED DESCRIPTION

Figure 1:
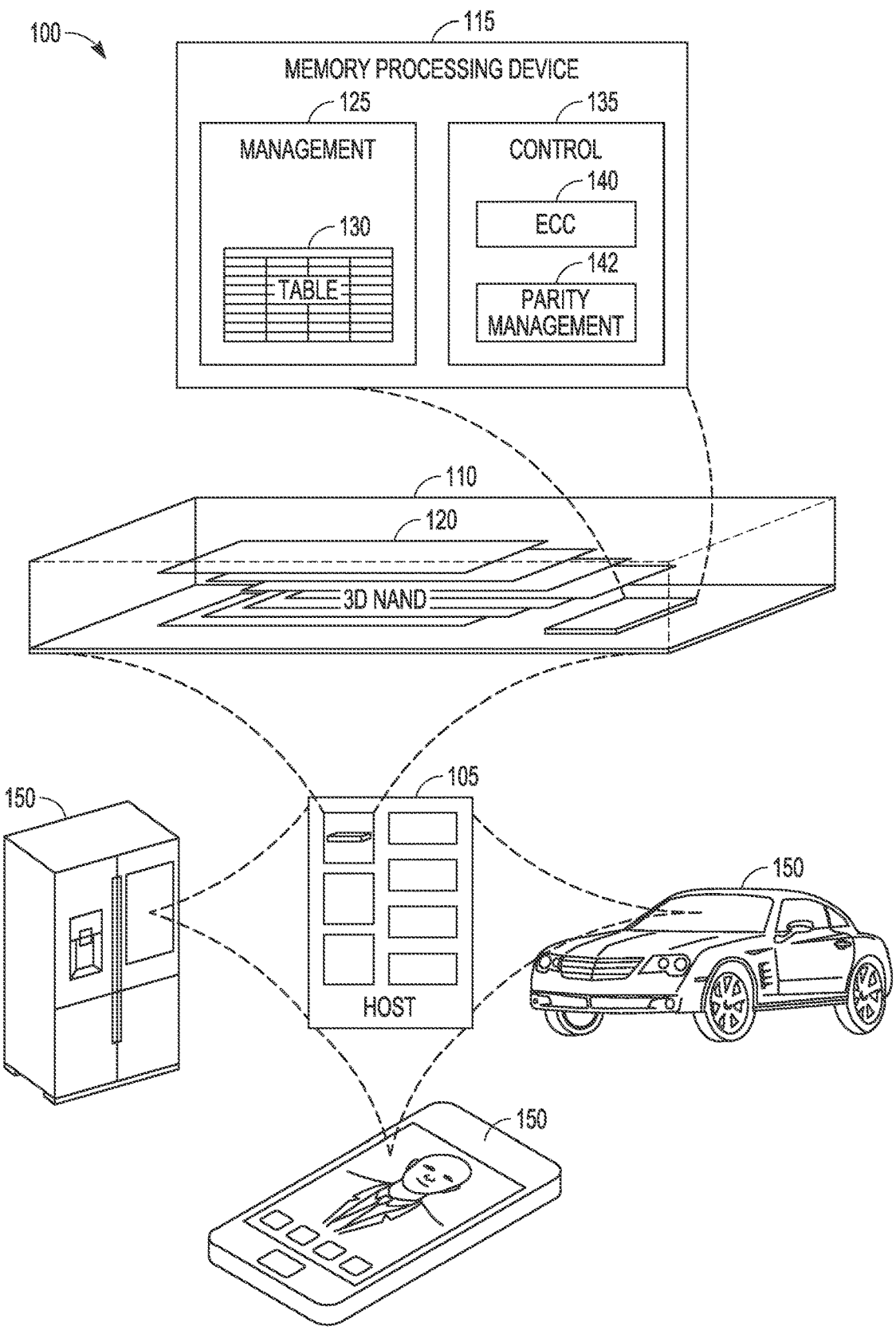
FIG. 1 illustrates an example of an environment including a memory device, according to various embodiments.

The following detailed description refers to the accompanying drawings that show, by way of illustration, various embodiments that can be implemented. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In general, a managed NAND system, also referred to as managed NAND, is realized as a combination of one or more individual NAND flash memory devices combined with a hardware controller that performs management features for the flash memories. SSD, UFS, and eMMC devices can be managed NAND memory systems that include processing circuitry such as one or more of memory controllers, direct memory access (DMA) controllers, and flash memory interface circuitry to manage the access to physical memory. In some latest generations of managed NAND devices, such as eMMC and UFS devices, redundant array of independent NAND (RAIN) protection can be introduced to protect data from corruption. RAIN is an umbrella term for data storage schemes that divide and/or replicate data among multiple pages of multiple NAND memory devices, for instance, in order to help protect the data stored in the memory devices. The multiple memory devices in a RAIN array may appear to a user and an operating system of a computing machine as a single memory device. RAIN schemes can include a dump of parity data from a volatile memory to a NAND device. The term "dump" means a transfer or a storage operation. Typically, after a dump, the data involved in the dump is allowed to be lost or removed from the volatile memory from which the dump occurred. Due to limited number of NAND dice per managed NAND device, the performance and overprovisioning impact of parity data dumps represents a big challenge.

Different methods and RAIN schemes have been proposed to cumulate parity data across word lines and across cursors, with and without swapping into a temporary NAND block. A cursor is effectively a pointer to an open block in which a data stream is being programmed into its own physical location for the type of data stream that it is. Moving to a next generation of NAND, there is a struggle to implement the different methods and RAIN schemes due to limited availability for storage of parity data such as in a SRAM. Typically, such SRAMs can be disposed in a current controller of a managed NAND system.

With a controller having a SRAM, or other form of volatile memory, as data comes to the controller of the managed NAND system from a host, the data is directed to the SRAM and from the SRAM to an associated open block. As the open block fills with data, the cursor advances and keeps track of the storage of the block and the data in transit in the SRAM. A cursor can be considered as an open stream. Consider the case of a data stream of SLC data coming from the host, a data stream of cold data, for storage in TLC memory, coming from the host, and a data stream from the host to be programmed to a high priority block. These three data streams will be written into different open NAND blocks, which will be different NAND block types such as a SLC block versus a TLC block versus a designated high priority block. Conventionally, it is desired that each block of these blocks has its own RAIN parity protection, which uses RAM to have independent parity data generated in parallel. However, this can lead to an issue of use of relatively large amounts of RAM to accommodate three RAIN parity data being generated in parallel.

To address such problems, in various embodiments as taught herein, parity data can be generated as a shared parity data between different cursors. In addition, a parity mapping and management algorithm can be introduced to achieve a high performance and memory efficient RAIN scheme. To avoid impact on write performances, parity data can be kept in a SRAM and dumped to NAND in idle time or just before entering low power mode to shut down SRAM. Due to limited SRAM resources, the parity data can be overlapped between different cursors and wrapped up allowing protection of data associated only with a few access lines. With respect to overlap, the different cursors can be for combinations of SLCs of memory and MLCs of memory. The MLCs can be, but are not limited to, TLCs of memory. In various embodiments, multiple data streams of data being programmed can include data for single-level cells of memory and data for multi-level cells of memory. In other embodiments, multiple data streams of data being programmed can include data for single-level cells of memory or multi-level cells of memory and data for triple-level cells of memory or multi-level cells or quad-level cells of cross point memory or ferroelectric random access memory. The overlapping can be performed with respect to parity data in slots of the SRAM, where as additional parity data is being stored for more than there are open slots of the SRAM, the additional parity data is wrapped back into slots of the SRAM containing parity data and overlapped with the parity data in the slot to which it is wrapped back. The overlapping of parity data in a slot, to which parity data is wrapped back, can be performed as an exclusive-or operation of the parity data in the slot. The wrapping back to a slot can be managed by pointers associated with the different types of data.

The overlap and wrapping of parity data between different cursors can be tracked using a map. A parity-to-data map can be updated and flushed to NAND along with the associated parity data. Herein, to flush data to a memory device is to store the data to the memory device. This map can allow for performing correct data reconstruction in case of failures. Optionally, frequency of dumps can be increased to tradeoff performance impact with reconstruction latency. With a dump to NAND based on filling the SRAM to a threshold amount of parity data content, the larger the threshold, the more parity data is saved, which increases the number of operations to reconstruct data due to a programming failure.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed NAND devices can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/r nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, ROM, an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as IoT devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of 3D NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array, such as to transfer data to (e.g., write or erase) or from (e.g., read) one or more of the memory cells, planes, sub-blocks, blocks, or pages of the memory array. The memory processing device 115 can include among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (IO) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory processing device 115. The array controller 135 can include a parity management component 142 that can include instructions for sharing parity data. The memory processing device 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding SLC NAND flash device. As such, the MLC device may require more metadata bytes for error data than the corresponding SLC device.

Figure 2:
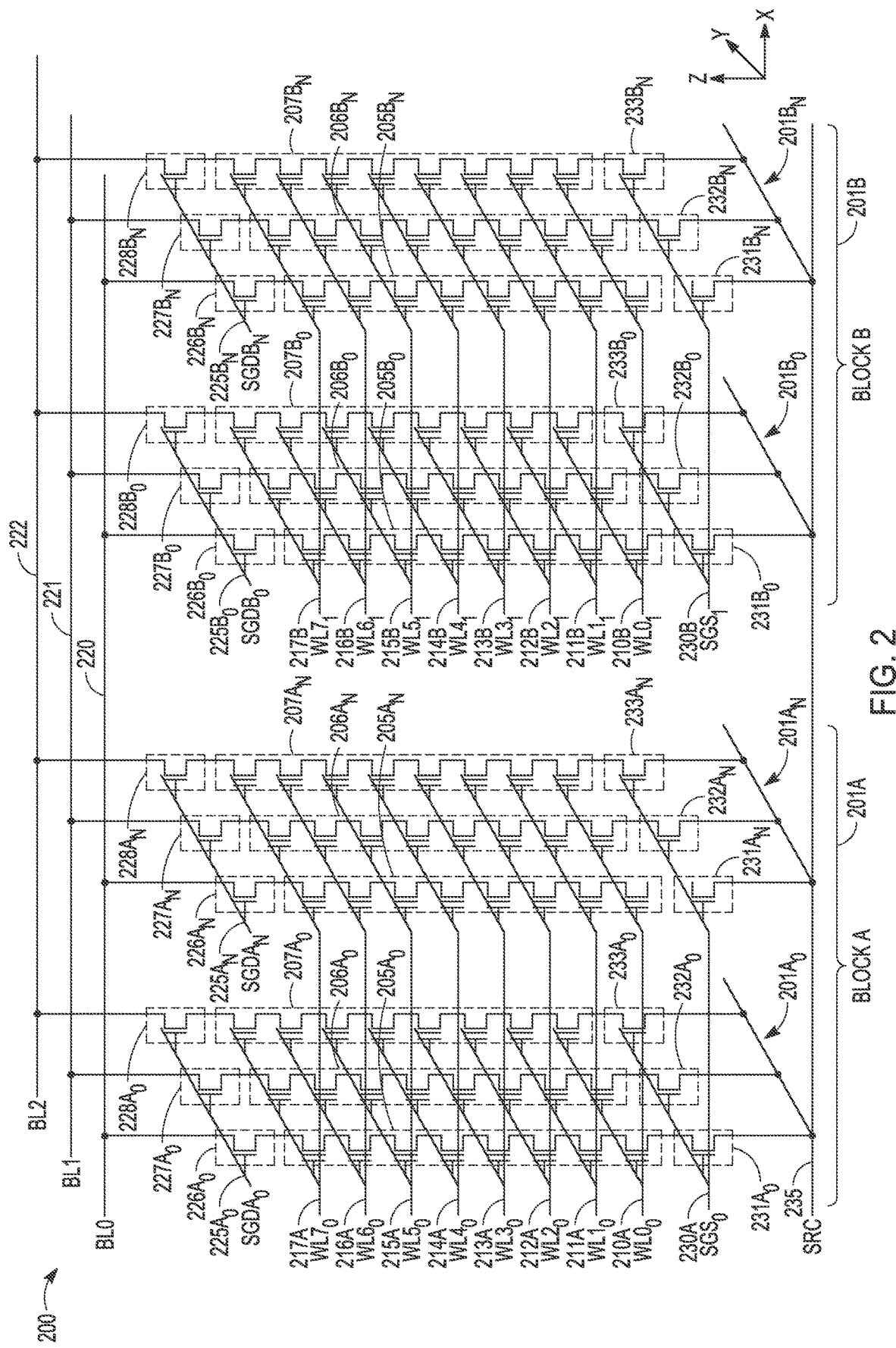
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 that can be implemented as memory array 120 of FIG. 1. The 3D NAND architecture semiconductor memory array 200 can include a number of strings of memory cells (e.g., first-third A0 memory strings $205A_0$-$207A_0$, first-third $A_0$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201 A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231 A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, with each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ 225A, first-third $A_n$ SGD $226A_n$-$228A_n$ can be accessed using an $A_n$ SGD line $SGDA_n$ 225$A_n$, first-third $B_0$ SGD $226B_0$-$228B_0$ can be accessed using an $B_0$ SGD line $SGDB_0$ 225$B_0$, and first-third $B_n$ SGD $226B_n$-$228B$ can be accessed using an $B_n$ SGD line $SGDB_n$ 225$B_0$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the CGs of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
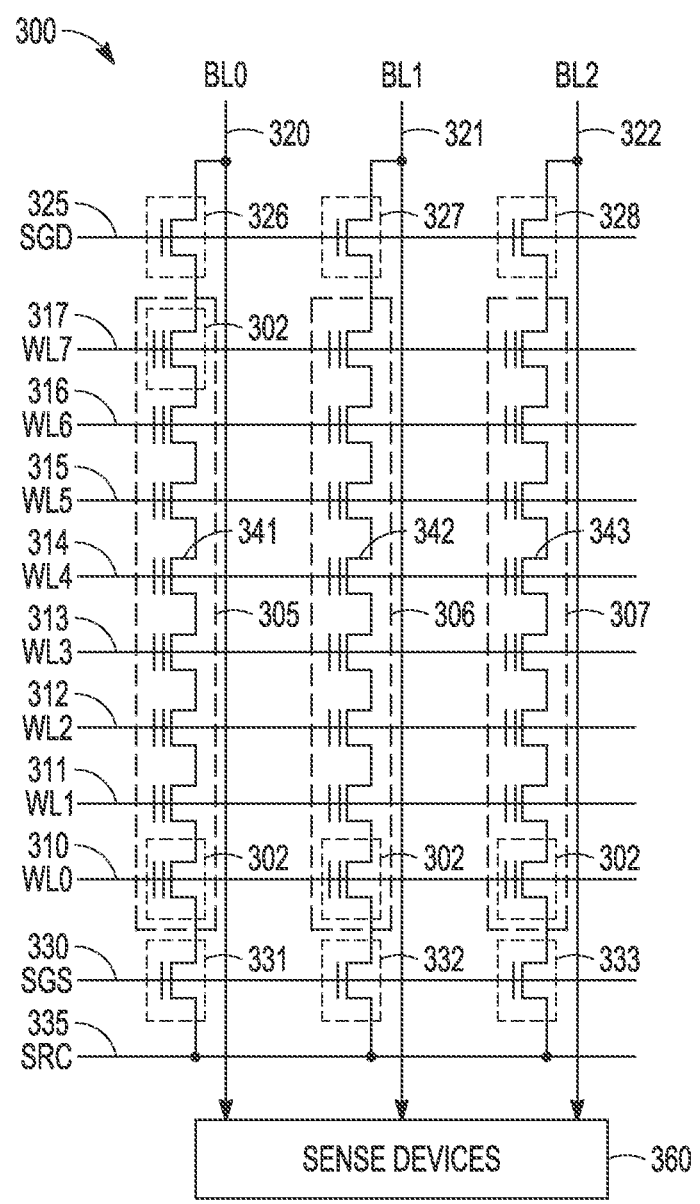

FIG. 3 illustrates an example schematic diagram of a portion of a NAND architecture semiconductor memory array 300 that can be implemented as memory array 120 of FIG. 1. The portion of the NAND architecture semiconductor memory array 300 can include a plurality of memory cells 302 arranged in a 2D array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third CGs 341-343 of the memory cells coupled to WL4). Programming pulses can begin, for example, at or near 15V. and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or FN tunneling, etc.) from the floating gates of the targeted memory cells to the channels.

Figure 4:
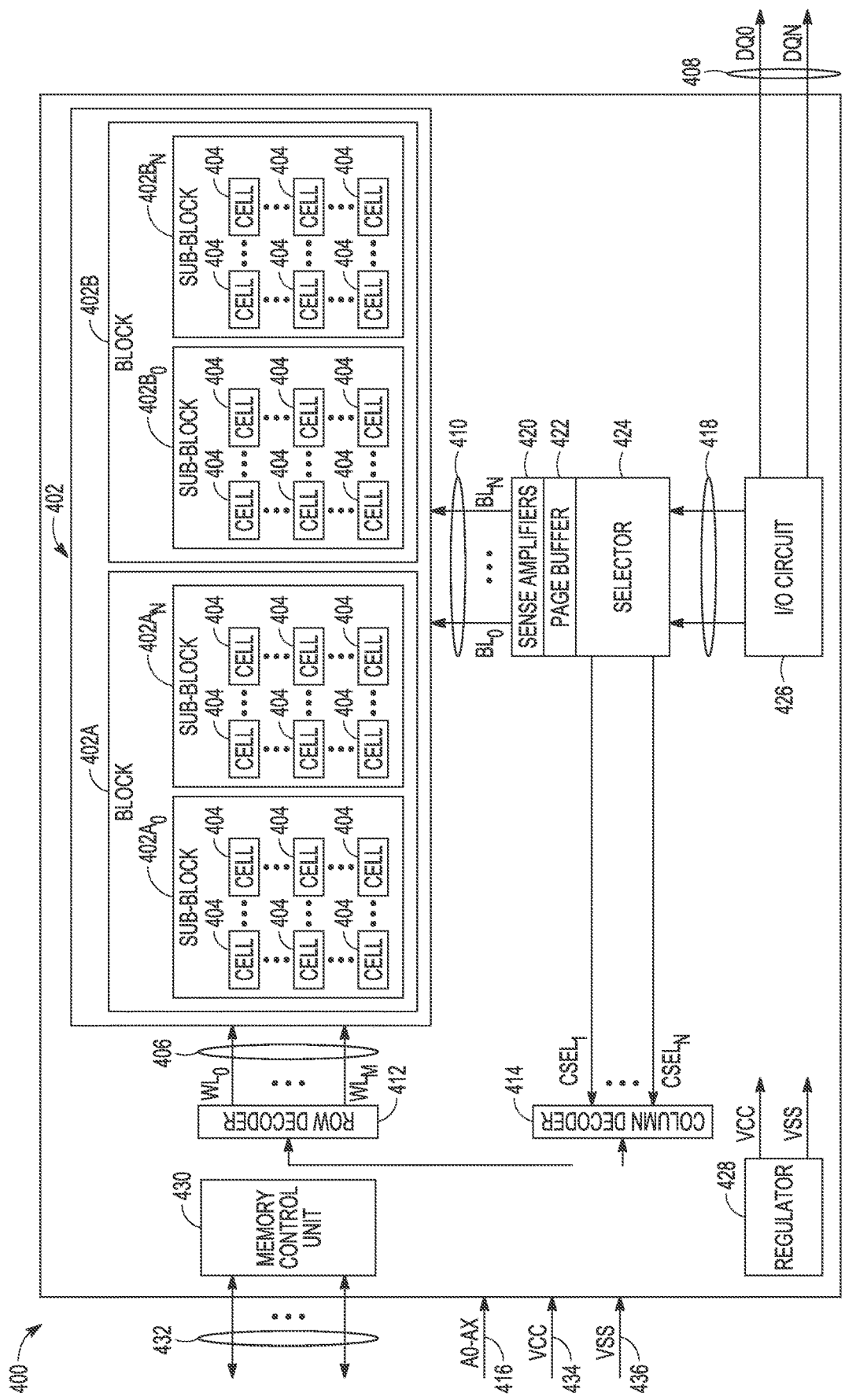
FIG. 4 illustrates an example block diagram of a memory module, according to various embodiments.

FIG. 4 illustrates an example block diagram of a memory device 400, which can be implemented memory device 110 of FIG. 1, including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an I/O circuit 426, and a memory control unit 430.

The memory cells 404 of the memory array 402 can be arranged in blocks, such as first and second blocks 402A. 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, with each page including a number of memory cells 404. Although illustrated herein as having two blocks, with each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432 or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The I/O circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
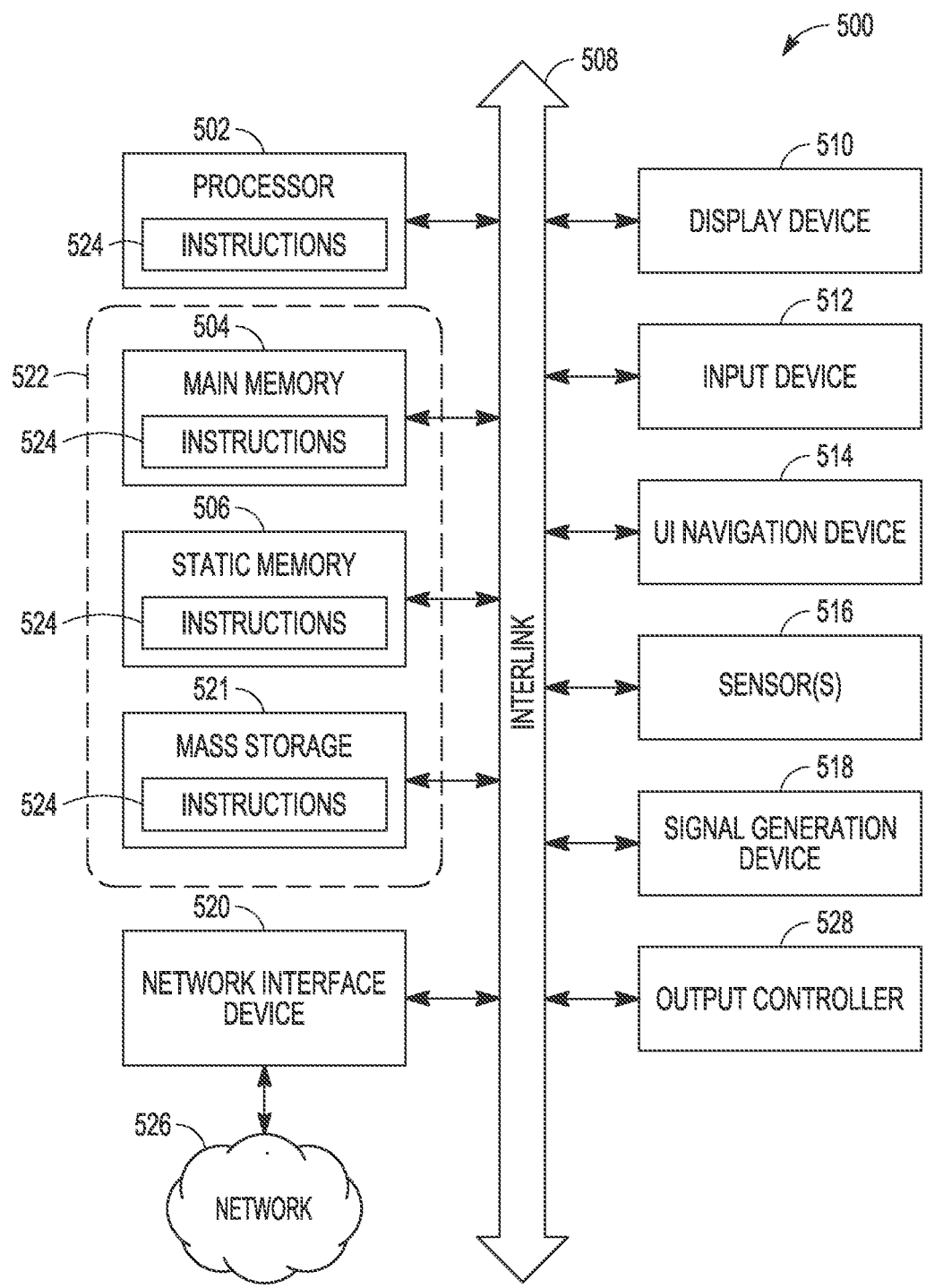
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The example machine 500 can be arranged to operate in the environment 100 of FIG. 1. The example machine 500 can include one or more memory devices having structures as discussed with respect to the memory array 200 of FIG. 2, the memory array 300 of FIG. 3, and the memory device 400 of FIG. 4.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a CPU, a GPU, a hardware processor core, or any combination thereof, such as the memory processing device 115, etc.), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512, and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., USB, parallel, or other wired or wireless (e.g., infrared (1R), near field communication (NFC), etc.) connection to communicate or control one or more peripheral devices (e.g., a printer, card reader, etc.).

The machine 500 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine readable medium 522. The instructions 524 can include instructions for parity management. Such parity management can include sharing of components that can combine parity data.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., EPROM, EEPROM) and flash memory devices; magnetic disks, such as internal hard disks and removable disks; magneto-optical disks; and compact disc-ROM (CD-ROM) and digital versatile disc-read only memory (DVD-ROM) disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival SATA based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of storing, encoding or carrying instructions for execution by the machine 500, and includes digital or analog communications signals or other tangible medium to facilitate communication of such software.

FIGS. 6A-6D illustrate an embodiment of an example of sharing parity data from multiple blocks, where the blocks are for different types of data programmed. The example scheme of sharing parity data can be implemented with respect to the environment 100 of FIG. 1. The example scheme of sharing parity data can be implemented with respect to one or more memory devices having structures as discussed with respect to the memory array 200 of FIG. 2, the memory array 300 of FIG. 3, and the memory device 400 of FIG. 4. In this example, a sixteen plane device is considered, with a four sub-block per WL architecture, and the blocks are a SLC block 652 and a TLC block 654. Parity data sharing is not limited to a plane based parity (where parity data is calculated by XOR-ing all planes in the system), but can be applied to different element-based parity such as sector based. NAND based etc. . . . . Parity data sharing is not limited to a sixteen plane device. Parity data sharing is not limited to a SLC block and a TLC block, but can be any number of multiple blocks and any types of data streams assigned to respective blocks corresponding to the data type. For example, parity data sharing can be implemented for various combinations of SLC memory of NAND devices. MLC memory of NAND devices, cells of cross point memory, cells of ferroelectric random access memory, and cells of other memory types. MLC memory can include TLC memory, QLC memory, and other levels of memory.

Figure 6A:
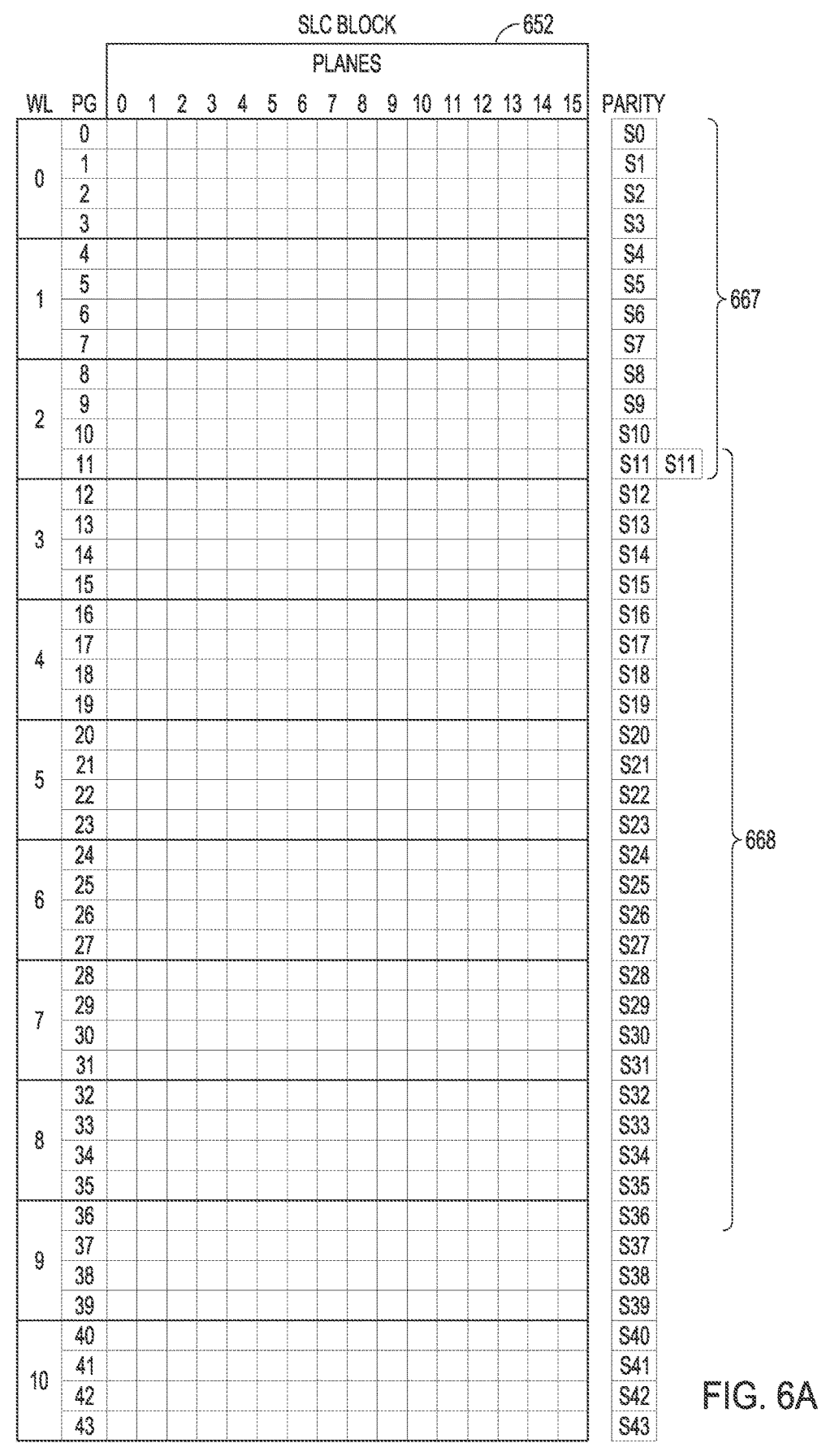
Figure 6B:
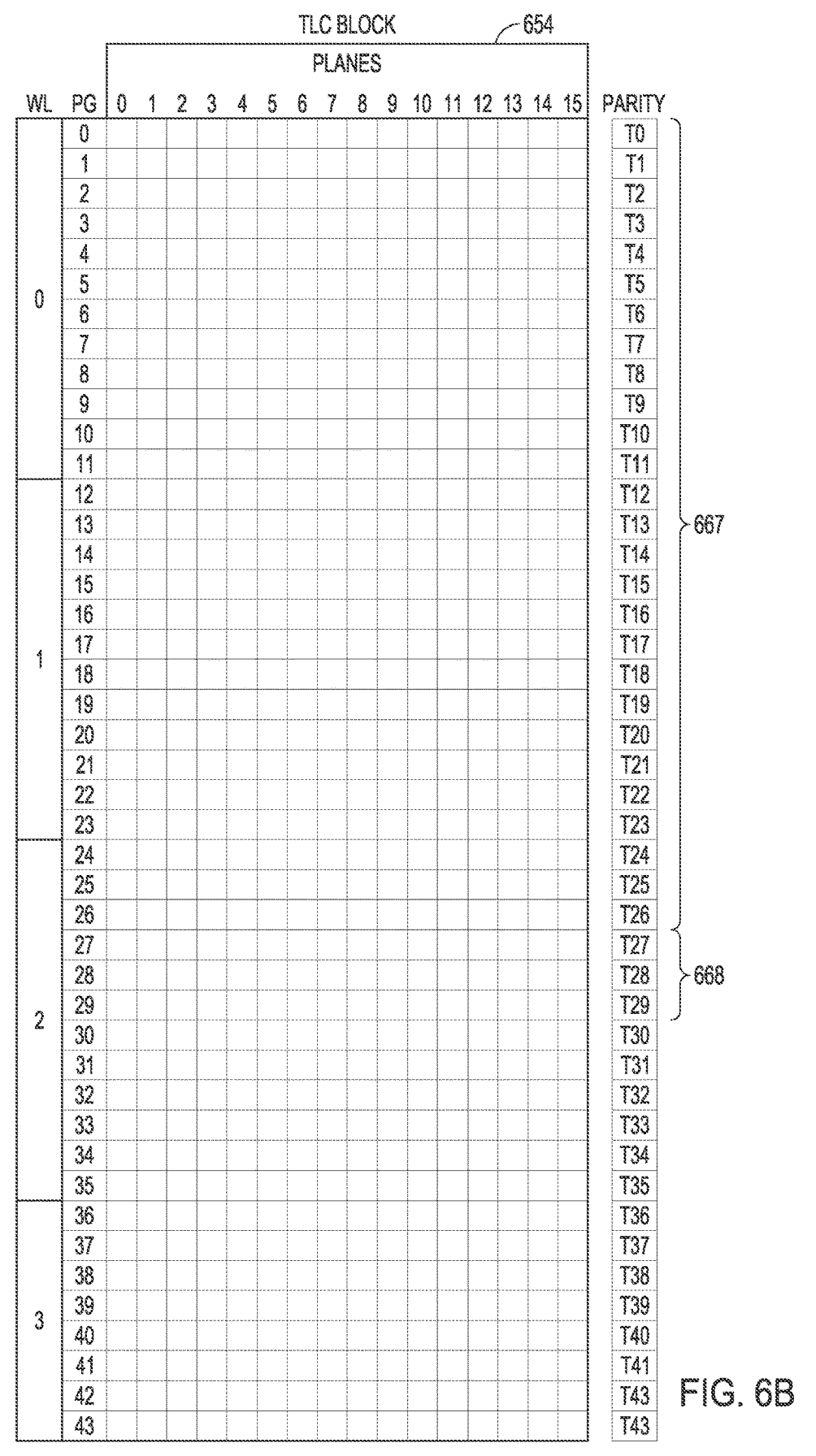

FIGS. 6A-6B show the SLC block 652 and the TLC block 654 programmed in two time periods 667 and 668 with time period 667 occurring before time period 668. As SLC data is loaded for the sixteen planes, 0-15, of a page in the SLC block 652, parity data is generated for that page. This parity data can be generated by an exclusive-or operation of the data in each plane of the page. For example, parity data S0 is generated from programming data via an access line WL 0 in the planes 0-15 for a page 0. Parity data S1 is generated from programming data via the access line WL 0 in the planes 0-15 for page 1. Parity data S2 is generated from programming data via the access line WL 0 in the planes 0-15 for page 2. Parity data S3 is generated from programming data via the access line WL 0 in the planes 0-15 for page 3. Parity data S4 is generated from programming data via an access line WL 1 in the planes 0-15 for page 4. Parity data S5 is generated from programming data via the access line WL 1 in the planes 0-15 for page 5. Parity data S6 is generated from programming data via the access line WL 1 in the planes 0-15 for page 6. Parity data S7 is generated from programming data via the access line WL 1 in the planes 0-15 for page 7. The programming and generation of parity data continues in a similar manner for the rest of SLC block 652 with each access line WL0-WL10 used to program four pages with page 0-page 3 . . . page 40-page 43 corresponding to access lines WL0 . . . WL10, respectively.

As TLC data is loaded for the sixteen planes, 0-15, of a page in the TLC block 654, parity data is generated for that page. This parity data can be generated by an exclusive-or operation of the data in each plane of the page. For example, parity data T0 is generated from programming data via an access line WL 0 in the planes 0-15 for page 0. Parity data T1 is generated from programming data via the access line WL 0 in the planes 0-15 for page 1. Parity data T2 is generated from programming data via the access line WL 0 in the planes 0-15 for page 2. Parity data T3 is generated from programming data via the access line W L 0 in the planes 0-15 for page 3. Parity data T4 is generated from programming data via the access line WL 0 in the planes 0-15 for page 4. Parity data T5 is generated from programming data via the access line WL 0 in the planes 0-15 for page 5. Parity data T6 is generated from programming data via the access line WL 0 in the planes 0-15 for page 6. Parity data T7 is generated from programming data via the access line WL 0 in the planes 0-15 for page 7. Parity data T8 is generated from programming data via the access line WL 0 in the planes 0-15 for page 8. Parity data T9 is generated from programming data via the access line WL 0 in the planes 0-15 for page 9. Parity data T10 is generated from programming data via the access line WL 0 in the planes 0-15 for page 10. Parity data T1 is generated from programming data via the access line WL 0 in the planes 0-15 for page 11. The programming and generation of parity data continues in a similar manner for the rest of TLC block 652 with each access line WL0-WL3 used to program twelve pages with page 0-page 11 . . . page 40-page 43 corresponding to access lines WL0 . . . WL3, respectively.

As parity data is generated for the pages in SLC block 652 and TLC 654, the generated parity data can be entered into a SRAM. The SRAM can be located in a controller, which is a processing device, or external to the controller in a managed NAND system for which the controller is a component. Other forms of volatile memory can be used to temporarily cache the data programmed, while generating the parity data. In this example, a SRAM can be used with 384 allocations. As parity data is generated and entered into the SRAM, it can be entered into open slots until the number of open slots in the SRAM are filled such that there are no more open slots. Upon the filling of a last slot of the SRAM, the next generated parity data can be added to the SRAM by wrapping around to the first slot of the SRAM and overlapping this next generated parity data with the parity data in the first slot. This overlapping in a slot is a combining of the parity data in the slot, which can be accomplished as an exclusive-or operation, which allows for reversing the process in the slot to address recovery from errors in programming data into memory.

The parity data generated after the abovementioned next parity data can be wrapped to the second slot in the SRAM. This procedure can continue for newly generated parity data until a threshold for a maximum number of parity data to be wrapped and overlapped in the SRAM. Such a threshold can be associated with a maximum number of parity data to be stored in the SRAM or a mathematical product of a maximum number of parity data to be overlapped in a slot and the number of slots in the SRAM for parity data. The threshold maximum can be set to a maximum number of accumulated pages to be used in a reconstruction process due to programming failure. Once the threshold maximum is reached, the parity contents of the SRAM can be dumped to a non-volatile memory, for example but not limited to, a NAND of the respective managed NAND system. The dumping of the parity contents can include a parity mapping, which can include pointers and identifications of physical addresses of the parity data. Optional adjustment of the maximum number of accumulated pages or other parameters for threshold maximum can be used to adjust the frequency of dumps to non-volatile memory to manage tradeoff performance impact with reconstruction latency.

In addition to the dumping of parity contents triggered by reaching a threshold maximum for parity data, other events can provide a criterion for transfer of parity contents of the storage device, such as the SRAM, to a non-volatile storage. These events can include a system, containing a memory system and its associated storage device for parity contents, going into a sleep mode. A sleep mode is a power mode. It may be defined in a standards specification for memory or a specification for an application in which a memory is used. When a system having one or more applications goes into a save power configuration, the system can place a memory system in sleep mode and remove the power to the memory system. The removal of power can be accomplished by providing a reduced current to a controller of the memory system such that the controller cannot conduct operations, but remains in standby (conducting standby operations if any) waiting for a wakeup signal or power. Other events can include saving power to the SRAM or other volatile memory holding the parity contents. There are a number of different low power states in which it is desired to shut off the SRAM, power gate the SRAM, or clock gate the SRAM to save the power that the SRAM is using. Prior to completion of these events, parity contents of the SRAM can be transferred to designated non-volatile memory.

For ease of discussion, consider data streams of SLC data and TLC data being programmed into the SLC block 652 and the TLC block 654, respectively, with data corresponding to TLC data programmed first during time period 667. FIG. 6C shows SRAM contents 656 at the end of the time period 667. At the start of the time period 667, parity data T0 is loaded into a first SRAM slot followed by parity data T1 loaded into a second SRAM slot and continuing in this sequential manner until parity data T23 is loaded into the last SRAM slot for parity data. Then, with the generation of parity data T24, the procedure includes wrapping back to the first slot to load the parity data T24 into the first slot by changing the contents of the first slot to the exclusive-or of parity data T0 with the parity data T24. With the generation of parity data T25, the contents of the second slot are changed to the exclusive-or of parity data T1 with the parity data T25. With the generation of parity data T26, the contents of the third slot is changed to the exclusive-or of parity data T2 with the parity data T26. In this example, at this point in time period 667, SLC data arrives.

The parity data S0 is loaded into the first SRAM slot, which contains the result of the exclusive-or of parity data T0 with the parity data T24, by performing an exclusive-or operation of the parity data S0 with the contents of the first SRAM slot, which results in T0 ⊕T24⊕S0. The symbol ⊕ is the exclusive-or operator. The parity data S is loaded into the second SRAM slot, which contains the result of the exclusive-or of parity data T1 with the parity data T25, by performing an exclusive-or operation of the parity data S0 with the contents of the first SRAM slot, which results in T1⊕T25⊕S1. As the parity data for SLC data is generated continuing with parity data S2, the SLC parity data is loaded sequentially in SRAM slots as the result of an exclusive-or with the contents of the SRAM slot to which it is being loaded, until a transfer criterion occurs.

In this example, the transfer criterion is a sleep mode. For whatever reason, the sleep mode is entered after plane 3 of page 11 is programmed via the access line WL 2. With the loading of data for plane 3 of page 11 of SLC, parity data S11 is generated, though the parity data S11 is effectively partial parity data, since it does not include data of planes 4-15 of page 11. As data is programmed to a plane of a page, parity data is generated with the data currently in other planes in the page. This partial parity data S11 is loaded into the twelfth SRAM slot resulting in T11⊕S11. Prior to completion of the sleep mode event, SRAM contents 656 can be dumped to a non-volatile memory such as a NAND device of a managed NAND system. The SRAM contents 656 flushed to the non-volatile memory can include a parity map of the SRAM contents 656. At the end of the time period 667 after transfer, the SRAM contents 656 are empty.

With the sleep mode ended, that is, at wake-up, data resumes being programmed into the SLC block 652 and the TLC block 654 and a parity map in the SRAM is reset to prepare for the new generation of parity data. With the resumption of programming, parity data are generated and loaded into the SRAM. With a die level write, parity data of partial page-access line may be rebuilt on wakeup such as the second S11 shown next to the SLC block 652. FIG. 6D shows SRAM contents 657 after wake-up and the resumption of further write operations and at the completion of time period 668 in which SLC parity data S1 . . . S36 and TLC parity data T27 . . . T29 are loaded into the SRAM. The loading of these parity data can be performed in the same manner as discussed above with respect to time period 667, except for the loading of S11.

With the wake-up, the parity map flushed to the non-volatile memory with the parity data can be accessed to determine the point at which the sleep mode began. The loading of the SRAM with parity data based on the SLC block 652 can begin with SLC parity data S11 generated from exclusive-or operations on the data from plane 0 of page 11 to data from plane 15 of page 11. The SRAM contents 657 are at the end of time period 668. If, at the end of time period 668, a transfer criterion has occurred such as some form of sleep mode, the SRAM contents 657 and associated parity map can be transferred to the non-volatile memory that stores the parity data and parity map. If, at the end of time period 668, a transfer criterion has not occurred, the SRAM contents 657 increase until a transfer criterion occurs such as a sleep mode or reaching a threshold maximum for storage of parity data in the SRAM.

For ease of discussion above, it was assumed that the TLC data arrives first. However, the loading of parity data S, for the SLC block 652 and the loading of parity data Tj for the TLC block 654 can be randomly interleaved based on the arrival of the data, which may be based on the nature of the data being programmed in the SLC block 652 and the TLC block 654. The parity data S, can overlap contents of SRAM slots sequentially starting with S0 in the first SRAM slot and wrapping back to the first slot. Likewise, the parity data Tj can overlap contents of SRAM slots sequentially starting with T0 in the first SRAM slot and wrapping back to the first slot. The wrapping back to a slot can be managed by pointers, associated with the different types of data, that keep track of the last slot accessed. The procedure can continue until a threshold maximum for loading parity data in the SRAM is reached or another transfer criterion, such as a sleep mode, occurs. In addition, recovery due to errors can be facilitated from the contents of the SRAM in response to defect activation during write causing data loss on access lines.

FIGS. 7A-7B illustrate an embodiment of an example of a parity map 761 of a volatile memory and a page—plane allocation 763 of an associated nonvolatile memory to which the parity map can be flushed along with parity data corresponding to the parity map. The example parity map and page-plane allocation can be implemented with respect to the environment 100 of FIG. 1. The example parity map and page-plane allocation can be implemented with respect to one or more memory devices having structures as discussed with respect to the memory array 200 of FIG. 2, the memory array 300 of FIG. 3, and the memory device 400 of FIG. 4. The parity map 761 can have different sizes depending on a flush policy for use of the volatile memory. In this example, a flush is forced when fifth parity data needs to be stored on the same parity slot. In such a flush policy, the fifth parity data to be added, occurring on wrapping back to the first slot in which an associated count has reached the threshold maximum for the number of parity data overlapped in the first slot, triggers a transfer criterion to flush the contents of the volatile memory, which can be a SRAM, to the associated nonvolatile memory, which can be a NAND device of a managed NAND system. The parity map 761 shows capacity (fourth column shown) for up to a fourth parity data, but does not show any fourth parity data in this example. The parity map 761 of FIG. 7A corresponds to the SRAM content 656 of FIG. 6C for which a sleep mode was entered. The parity map 761 is considered with respect to a discussion regarding the transfer of parity content of the SRAM to the nonvolatile memory, which can be a NAND device in a managed NAND system configuration.

The parity map 761 is an example of a parity map using the example structure of a sixteen plane device with the SLC block 652 and the TLC block 654 of FIGS. 6A-6D. The parity map 761 includes a number of parity slots, a count of the number of parity data overlapped in each slot, and identities of the parity data in the count that can be provided as the physical addresses associated with each parity data in the count in each slot. For example, the first parity slot of the SRAM can be referenced as slot 0 and, from the example of SRAM contents 656 of FIG. 6C, contains a count of three, which identifies parity data T0, parity data T24, and parity data S0 as the stored parity data in the first parity slot of the SRAM. The slot 1 contains a count of three, identifying parity data T1, parity data T25, and parity data S1 as the stored parity data in the second parity slot of the SRAM. As shown in FIG. 7A, the parity map 761 has twenty-three parity slots. Due to the occurrence of the sleep mode that occurred at the end of the time period 667 of the example of FIGS. 6A-6D, none of the parity slots have reached a maximum threshold for the number of parity data that can be overlapped in a parity slot of the SRAM, which results in the parity map 761 not reflecting full use of the SRAM for parity storage.

Upon entering the sleep mode at the end of the time period 667 of the example of FIGS. 6A-6D, the parity contents 656 of the SRAM are transferred to its associated non-volatile memory device, including the parity map 761. With the parity map 761 having twenty-four slots for parity data and with the sixteen plane device of the current example, the parity data in the first parity slot of the SRAM, parity slot 0, is transferred to plane 0 of page 0. The parity contents of parity slot 1 are transferred to plane 1 of page 0. The parity contents of parity slots 2 . . . 15 are transferred to plane 2 of page 0 . . . plane 15 of page 0, respectively. With the number of parity slots in the SRAM different from the number of planes of the non-volatile memory device, there is not a one-to-one correspondence of all parity slots to planes of a single page and, in general, the correspondence can change at each dump and can be tracked by firmware using a higher level map. In this example, the number of parity slots is greater than the number of planes, which results in the parity contents of parity slot 16 being transferred to plane 0 of page 1. The parity contents of parity slot 17 are transferred to plane 1 of page 1. The parity contents of parity slot 18 are transferred to plane 2 of page 1. The parity contents of parity slot 19 are transferred to plane 3 of page 1. Likewise, the parity contents of parity slot 20 . . . parity slot 23 are transferred to plane 4 of page 1 . . . plane 7, of page 1, respectively. The parity map 761 is transferred to plane 8 of page 1. Following plane 8 of page 1, other synchronizing data can be stored. This other synchronizing data can include the SRAM contents 657 of the example of FIG. 6D.

As can be seen from comparing SRAM contents 656 of FIG. 6C and page-plane allocation 763 of FIG. 7B, the contents of each of planes 0 . . . 15 of page 0 and planes 0 . . . 7 of page 1 can include parity data that represents multiple parity data. The number of multiple parity data for each plane of each page is given by the parity map transferred to plane 8 of page 1 of the non-volatile memory. The number of multiple parity data can vary depending on the transfer criterion that was triggered. When the transfer is based on the maximum number of parity data being included in each parity slot, then for the example of FIGS. 7A-7B, the contents of each of planes 0 . . . 15 of page 0 and planes 0 . . . 7 of page 1 include a parity that represents four items of parity data. Depending on the SRAM implemented, or other volatile memory implemented, the maximum number of parity data represented by the parity contents of a parity slot of the SRAM, and, hence, each plane of a page can be adjusted in firmware of the memory system for which the SRAM is used.

Figure 8:
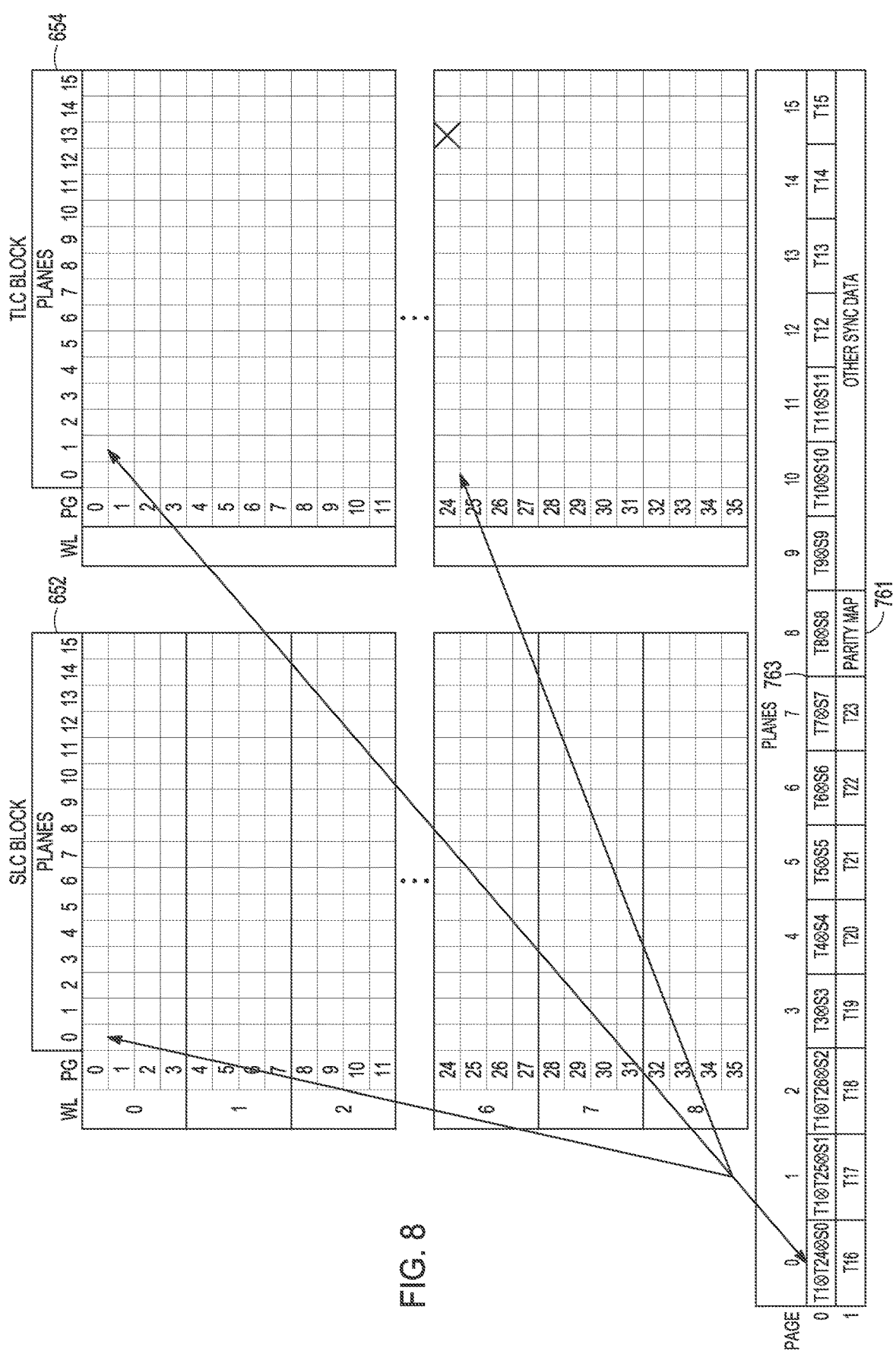
FIG. 8 shows a relationship between parity data stored in a non-volatile memory after transfer from a volatile memory and data blocks with respect to the example of FIGS. 6A-6D, according to various embodiments.

FIG. 8 shows a relationship between parity data stored in a non-volatile memory after transfer from a volatile memory and data blocks with respect to the example of FIGS. 6A-6D. The parity content at page 0 of plane 0 in the page-plane allocation 763 of the non-volatile memory includes parity data generated from T0⊕T24⊕S0, where T0 is parity data of page 0 of the TLC block 654, T24 is parity data of page 24 of the TLC block 654, and S0 is parity data of page 0 of the SLC block 652. With the contents of page-plane allocation 763 of the non-volatile memory, a page of a plane in SLC block 652 or TLC block 654 can be reconstructed after an error event. For example, page 24 of plane 13 of the TLC block 654 can be reconstructed with an XOR operation of the all the pages pointed to in FIG. 8, that is, page 0 of the TLC block 654, page 24 of the TLC block 654, and page 0 of the SLC block 652. These pages are identified in the parity map 761 stored in the page-plane allocation 763 of the non-volatile memory.

Figure 9:
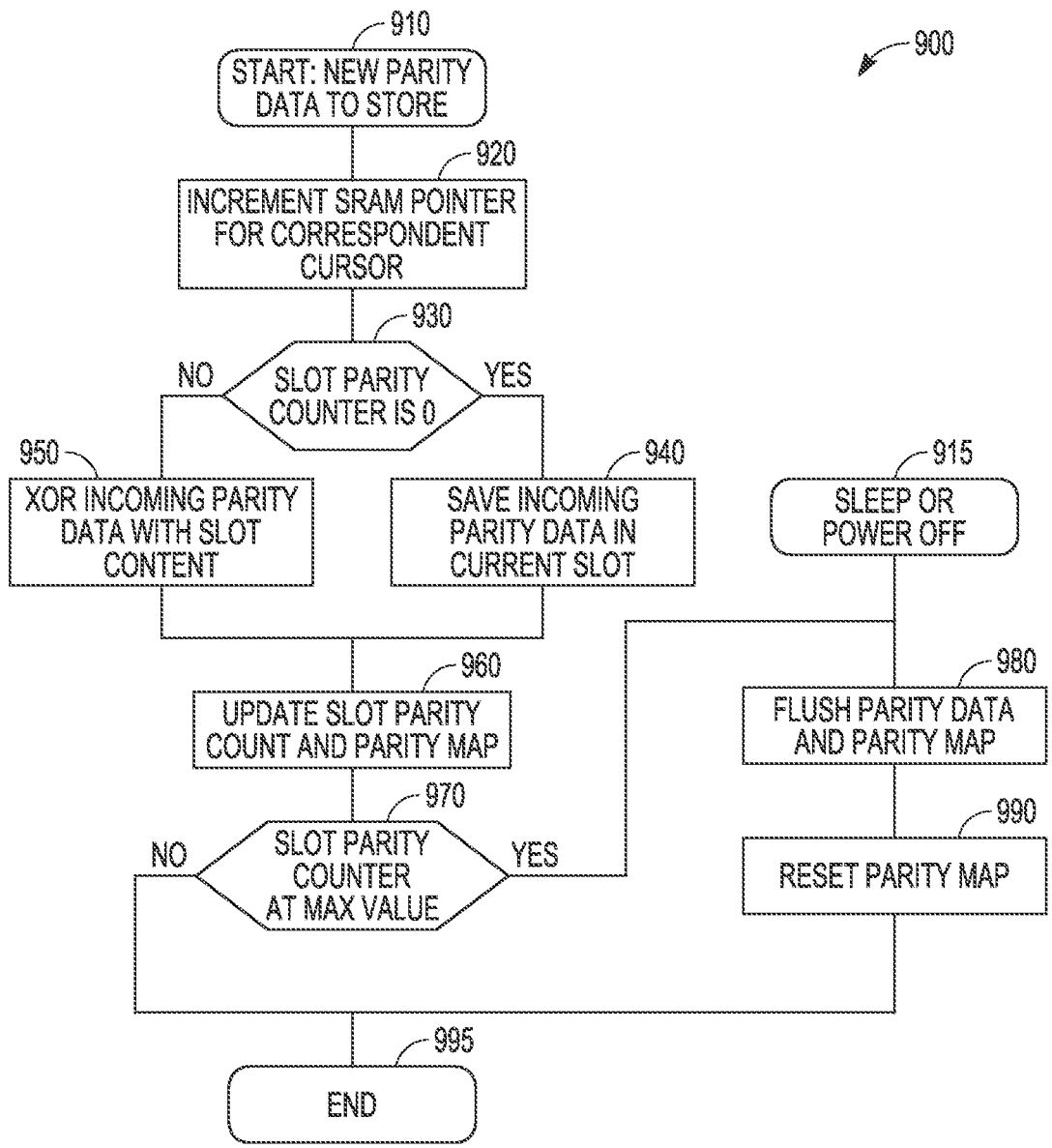
FIG. 9 is a flow diagram of features of an example method of incorporating new parity data in a storage device in a volatile memory using a management algorithm, according to various embodiments.

FIG. 9 is a flow diagram of features of an embodiment of an example method 900 of incorporating new parity data in a storage device in a volatile memory, such as a SRAM, using a management algorithm. The example method 900 can be implemented with respect to the environment 100 of FIG. 1. The example method 900 can be implemented with respect to one or more memory devices having structures as discussed with respect to the memory array 200 of FIG. 2, the memory array 300 of FIG. 3, and the memory device 400 of FIG. 4. The example method 900 can be viewed with respect to the parity map 761 of FIG. 7A and the wrapping and overlapping of parity of FIGS. 6A-6D as examples. At 910, to start, new parity data is generated to store in a current slot in the SRAM. At 920, a SRAM pointer is incremented for a cursor correspondent to the new parity data. At 930, a determination is made as to whether the slot parity counter, from the operation at 920, is equal to zero for the current slot. If the counter is zero, the current slot does not contain parity data. If the counter is greater than zero, the slot contains parity data. At 940, with the slot parity counter equal to zero, the incoming parity data is saved in the current slot.

At 950, with the counter greater than zero, an exclusive-or operation is performed with respect to the incoming parity data (new parity data) and the contents of the slot. At 960, after saving the incoming parity data in the current slot or saving the result of performing an exclusive-or operation of the incoming parity data and the contents of the current slot, the slot parity count is updated and the parity map is updated. At 970, a determination of whether the slot parity count is at a maximum value is made. If the determination at 970 is no, the management algorithm ends, at 995, for the new parity data generated at 910.

If the determination at 970 is yes, the parity data of the SRAM and the parity map are flushed to a designated non-volatile memory, at 980. Also, at 980, in response to a sleep or power off operation at 915, the parity data of the SRAM and the parity map are flushed to the designated non-volatile memory. At 990, the parity map can be reset for resumption of further data programming and associated parity data generation and the wrapping and overlapping of parity data. In response to resetting the parity map at 990, the management algorithm ends, at 995, for the new parity data generated at 910.

The scheme of method 900 is extensible to multiple cursors, where each cursor can have a dedicated pointer to the memory slot where a last parity data has been stored. As discussed above with respect to FIGS. 6A-6D, a pointer for SLC cursor can be used to identify that parity data S0 was stored in the first slot (slot 0) of the SRAM, when parity data S1 is generated for storage in the SRAM and a pointer for TLC cursor can be used to identify that parity data T0 was stored in the first slot (slot 0) of the SRAM, when parity data T1 is generated for storage in the SRAM. Further, the pointer for TLC cursor can be used to identify that parity data T25 was stored in the second slot (slot 1) of the SRAM, when parity data T26 is generated for storage in the SRAM. The maximum value of the counter may be chosen to trade off rebuilding complexity and memory occupation of the parity map with performance and latency impact of the forced parity dump operation.

Figure 10:
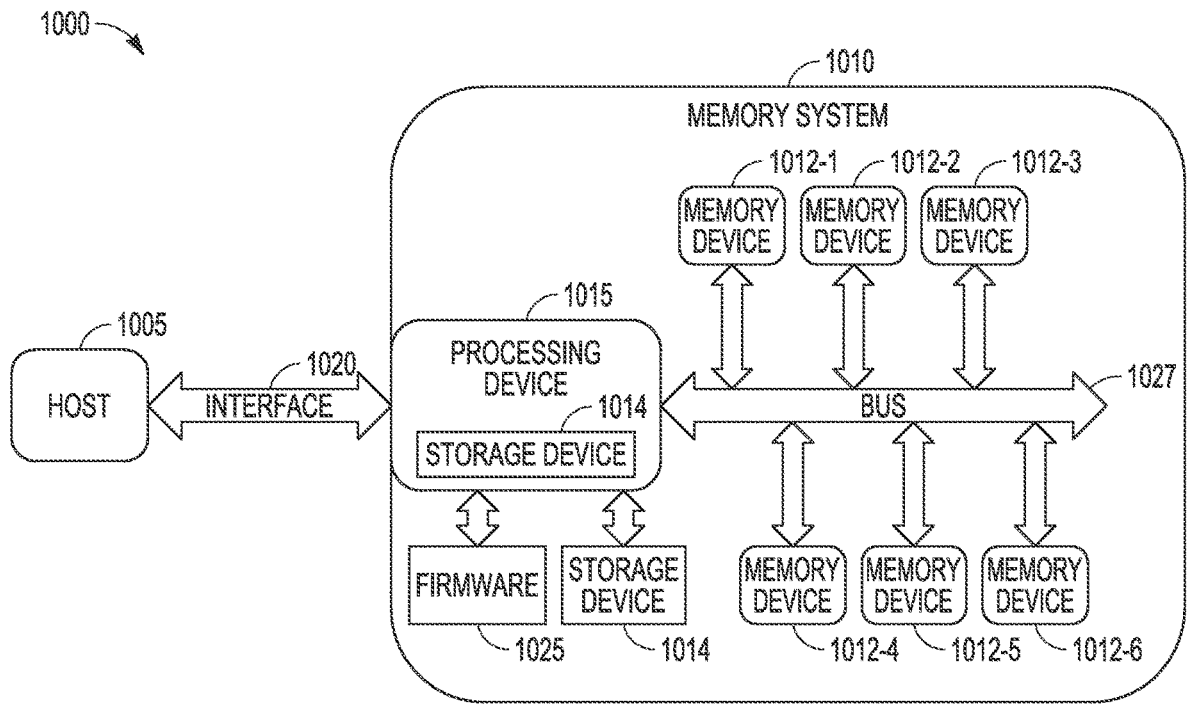
FIG. 10 is a block diagram of an example system including a host that operates with a memory system having shared parity protection, according to various embodiments.

FIG. 10 is a block diagram of an embodiment of example system 1000 including a host 1005 that operates with a memory system 1010 having shared parity protection. The example system 1000 can be implemented with respect to the environment 100 of FIG. 1. The example system 1000 can be implemented with respect to one or more memory devices having structures as discussed with respect to the memory array 200 of FIG. 2, the memory array 300 of FIG. 3, and the memory device 400 of FIG. 4.

In this example embodiment, the host 1005 is coupled to the memory system 1010 by an interface 1020. The memory system 1010 can include a processing device 1015 coupled to memory devices 1012-1, 1012-2, 1012-3, 1012-4, 1012-5, and 1012-6 by a bus 1027. The memory devices 1012-1, 1012-2, 1012-3, 1012-4, 1012-5, and 1012-6 can be NAND memory devices. Though six memory devices are shown in FIG. 10, the memory system 1010 can be implemented with less or more than six memory devices, that is memory system 1010 can comprise one or more memory devices. The memory devices can be realized in a number of formats including but not limited to a plurality of memory dies. The processing device 1015 can include or be structured as one or more processors. The processing device 1015 can be structed as one or more memory controllers.

In the example system 1000, the processing device 1015 is configured (e.g., hardware and/or software implementation) to perform the parity scheme methods described herein, including the exemplary methods described with reference to FIGS. 6-9 and 11. For example, the processing device 1015 can store instructions for performing the sharing of parity data described herein. The instructions can be stored external to the processing device 1015. The processing device 1015 can comprise code executable by the processing device 1015 to at least manage the memory devices 1012-1, 1012-2, 1012-3, 1012-4, 912-5, and 1012-6. In the present example, the instructions are included in firmware 1025. The firmware 1025 can reside in a storage device of the memory system 1010 coupled to the processing device 1015. The firmware 1025 can be coupled to the processing device 1015 using the bus 1027 or some other interface on the memory system 1010. Alternatively, the firmware 1025 can reside in the processing device 1015 or can be distributed in the memory system 1010 with firmware components, such as but not limited to code, including one or more components in the processing device 1015. The firmware 1025 can include code having instructions, executable by the processing device 1015, to operate on the memory devices 1012-1, 1012-2, 1012-3, 1012-4, 1012-5, and 1012-6. The instructions, executable by the processing device 1015, can include instructions to execute shared parity protection for data programmed into memory devices of the memory system 1010, as taught herein, where a storage device 1014 is used to handle parity data. The storage device 1014 can be structured internal or external to the processing device 1015. The parity scheme can be implemented as a RAIN scheme.

The system 1000 and its components can be structured in a number of different arrangements. For example, the system 1000 can be arranged with a variation of the type of components that comprise the host 1005, the interface 1020, the memory system 1010, the memory devices 1012-1, 1012-2, 1012-3, 1012-4, 1012-5, and 1012-6, the processing device 1015, and the bus 1027. The host 1005 can comprise one or more processors, which can vary in type. The interface 1020 can be arranged as, but not limited to, a PCIe interface. The memory system 1010 can be, but is not limited to, a SSD. The memory system 1010 can be structured as a managed NAND system. The memory devices 1012-1, 1012-2, 1012-3, 1012-4, 1012-5, and 1012-6 can be NAND memory devices. The processing device 1015 can include or be structured as one or more types of processors compatible with the memory devices 1012-1, 1012-2, 1012-3, 1012-4, 1012-5, and 1012-6. The bus 1027 can be an open NAND flash interface (ONFI) bus for the memory devices 1012-1, 1012-2, 1012-3, 1012-4,1012-5, and 1012-6 being NAND flash memory devices. The storage device 1014 can be, or included in, a RAM, such as a SRAM. Though storage device 1014 is external to processing device 1015 in memory system 1010 in FIG. 10, the storage device 1014 may be integrated into the processing device 1015. The storage device 1014 can be coupled to the bus 1027 for communication with other components of the memory system 1010. Alternatively, the storage device 1014 can be coupled with processing device 1015 in which the processing device 1015 handles communications between the storage device 1014 and other components of the memory system 1010. The storage device 1014 can be coupled to the bus 1027 and to the processing device 1015.

In various embodiments, the processing device 915 can have stored instructions or the firmware 1025 can have stored instructions, such as a microcode, executable by the processing device 1015, to operate on multiple memory devices of the memory devices 1012-1, 1012-2, 1012-3, 1012-4, 1012-5, and 1012-6, where each memory device includes an array of memory cells organized into one or more planes, and the multiple memory devices can be organized into multiple blocks, where each block has multiple pages. The instructions in the firmware 1025 can be executed to perform operations to: program, on a page basis, multiple data streams into planes of blocks of the multiple blocks such that data streams of different types are programmed into different blocks of the multiple blocks; generate parity data for data programmed for each page in which data of the multiple data streams is programmed; store the parity data in the storage device, the storage device configured to hold parity data with the parity data of one or more pages of one type of the different types of data streams overlapped with the parity data of one or more other types of the different types of data streams; and transfer parity contents of the storage device to a non-volatile storage device in response to a determination of occurrence of a transfer criterion.

Variations of instructions of the firmware 1025 or similar firmware can include a number of different embodiments that may be combined depending on the application of such firmware and/or the architecture of systems in which such firmware is implemented. Such instructions of the firmware, which when executed by one or more processing devices, can cause performance of operations, which operations can include generation of a map of the stored parity and transfer of the map as part of the parity contents. The map generated and controlled by the instructions of the firmware 1025 can include identification of parity data overlapped in a storage slot of the storage device 1014. Such a map can include a pointer that identifies, for a respective parity, a block of the multiple blocks and planes of the block used to generate the respective parity. The operations can include reconstruction of data using the map in response to detection of a failure in programming data.

The operations can include performance of one or more exclusive-or operations to conduct the overlap of parity data. The multiple data streams can include data for single-level cells of memory and data for multi-level cells of memory. The multiple data streams include data for single-level cells of memory or multi-level cells of memory and data for triple-level cells of memory or multi-level cells or quad-level cells of cross point memory or ferroelectric random access memory.

The transfer criterion can include the storage device 1014 entering a power mode or the parity stored in the storage device 1014 reaching a set maximum amount of parity to store. The power mode can include idle time of the non-volatile storage device or a power mode to shut down the storage device. The storage device 1014 can include a static random access memory device to temporarily cache the data while generating the parity data. Frequency of transfer of parity contents from the storage device 1014 for the transfer criterion can be adjusted based on a tradeoff condition between performance impact and reconstruction latency.

Figure 11:
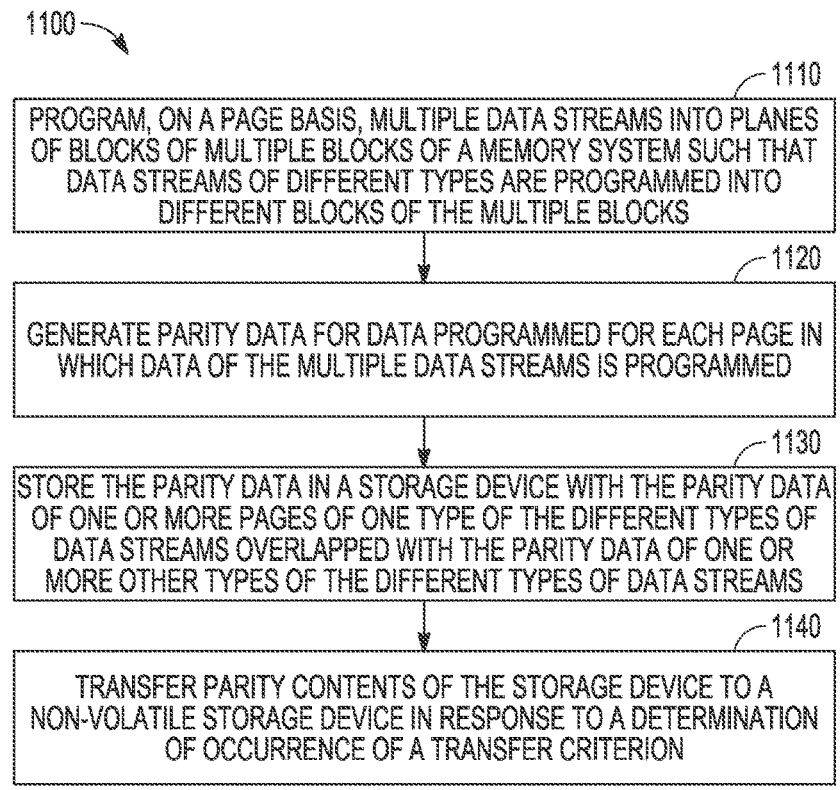
FIG. 11 is a flow diagram of features of an example method providing shared parity protection to data in memory devices, according to various embodiments.

FIG. 11 is a flow diagram of features of an embodiment of an example method 1100 providing shared parity protection to data in memory devices. The example method 1100 can be implemented with respect to the environment 100 of FIG. 1. The example method 1100 can be implemented with respect to one or more memory devices having structures as discussed with respect to the memory array 200 of FIG. 2, the memory array 300 of FIG. 3, and the memory device 400 of FIG. 4. At 1110, multiple data streams are programmed, on a page basis, into planes of blocks of multiple blocks of a memory system such that data streams of different types are programmed into different blocks of the multiple blocks. The multiple data streams can include data for single-level cells of memory and data for multi-level cells of memory. The multiple data streams can include data for single-level cells of memory or multi-level cells of memory and data for triple-level cells of memory or multi-level cells or quad-level cells of cross point memory or ferroelectric random access memory.

At 1120, parity data is generated for data programmed for each page in which data of the multiple data streams is programmed. At 1130, the parity data is stored in a storage device with the parity data of one or more pages of one type of the different types of data streams overlapped with the parity data of one or more other types of the different types of data streams. One or more exclusive-or operations can be used to conduct the overlap of parity data. At 1140, parity contents of the storage device are transferred to a non-volatile storage device in response to a determination of occurrence of a transfer criterion. The transfer criterion can include the non-volatile storage device entering an idle time, the storage device entering a power mode to shut down the storage device, or the parity data stored in the storage device reaching a set maximum amount of parity data to store.

Variations of the method 1100 or methods similar to the method 1100 can include a number of different embodiments that may be combined depending on the application of such methods and/or the architecture of systems in which such methods are implemented. Such methods can include generating a map of the stored parity data and transferring the map as part of the parity contents transferred to the non-volatile storage device in response to the determination of occurrence of the transfer criterion. Generating the map can include generating identification of parity data overlapped in a storage slot of the storage device and generating a pointer that identifies, for a respective parity data, a block of the multiple blocks and planes of the block used to generate the respective parity data. In response to detection of a failure in programming data, data can be reconstructed using the map.

In various embodiments, a system can comprise one or more memory devices, each memory device including an array of memory cells organized into one or more planes, the one or more memory devices organized into multiple blocks;

a storage device separate from the one or more memory devices; and firmware having stored instructions executable by a processing device. The firmware can have stored instructions, executable by a processing device, to perform operations to: program, on a page basis, multiple data streams into planes of blocks of the multiple blocks such that data streams of different types are programmed into different blocks of the multiple blocks; generate parity data for data programmed for each page in which data of the multiple data streams is programmed; store the parity data in the storage device, the storage device configured to hold parity data with the parity data of one or more pages of one type of the different types of data streams overlapped with the parity data of one or more other types of the different types of data streams; and transfer parity contents of the storage device to a non-volatile storage device in response to a determination of occurrence of a transfer criterion. The operations can include generation of a map of the stored parity data and transfer of the map as part of the parity contents.

Variations of a system and its features, as taught herein, can include a number of different embodiments and features that may be combined depending on the application of such systems and/or the architecture in which systems are implemented. Features of such systems can include the map arranged to include identification of parity data overlapped in a storage slot of the storage device. The map can include a pointer that identifies, for a respective parity data, a block of the multiple blocks and planes of the block used to generate the respective parity data. Operations can include reconstruction of data using the map in response to detection of a failure in programming data.

Variations of a system, as taught herein, can include operations in which performance of one or more exclusive-or operations is used to conduct the overlap of parity data. The multiple data streams can include data for single-level cells of memory and data for multi-level cells of memory. The multiple data streams can include data for single-level cells of memory or multi-level cells of memory and data for triple-level cells of memory or multi-level cells or quad-level cells of cross point memory or ferroelectric random access memory.

Variations of a system, as taught herein, can include frequency of transfer of parity contents for the transfer criterion adjusted based on a tradeoff condition between performance impact and reconstruction latency. The transfer criterion can include the storage device entering a power mode or the parity data stored in the storage device reaching a set maximum amount of parity data to store. The power mode can include idle time of the non-volatile storage device or a power mode to shut down the storage device.

Variations of a system, as taught herein, can include the storage device structured to include a static random access memory device to temporarily cache the data while generating the parity data prior to the transfer of the parity contents. The storage device can be configured as part of the processing device. The processing device and the one or memory devices can be components of a managed NAND memory system and the non-volatile storage device in which parity contents is flushed can be a NAND device.

In various embodiments, a system can comprise firmware having stored instructions, executable by a processing device, to perform operations to: program, on a page basis, multiple data streams into planes of blocks of multiple blocks of a memory system such that data streams of different types are programmed into different blocks of the multiple blocks; generate parity data for data programmed for each page in which data of the multiple data streams is programmed: store the parity data in a storage device with the parity data of one or more pages of one type of the different types of data streams overlapped with the parity data of one or more other types of the different types of data streams; and transfer parity contents of the storage device to a non-volatile storage device in response to a determination of occurrence of a transfer criterion. The operations can include generation of a map of the stored parity data and transfer of the map as part of the parity contents.

Variations of a system and its features, as taught herein, can include a number of different embodiments and features that may be combined depending on the application of such systems and/or the architecture in which systems are implemented. Features of such systems can include the map arranged to include identification of parity data overlapped in a storage slot of the storage device and a pointer that identifies, for a respective parity data, a block of the multiple blocks and planes of the block used to generate the respective parity data. The operations can include reconstruction of data using the map in response to detection of a failure in programming data.

Variations of a system, as taught herein, can include the multiple data streams including data for single-level cells of memory or multi-level cells of memory and data for triple-level cells of memory or multi-level cells or quad-level cells of cross point memory or ferroelectric random access memory. The s transfer criterion can include the non-volatile storage device entering an idle time, the storage device entering a power mode to shut down the storage device, or the parity data stored in the storage device reaching a set maximum amount of parity data to store.

The following are example embodiments of systems and methods, in accordance with the teachings herein.

An example system 1 can comprise: one or more memory devices, each memory device including an array of memory cells organized into one or more planes, the one or more memory devices organized into multiple blocks; a storage device separate from the one or more memory devices; and the system comprising a processor configured to execute instructions stored on one or more components in the system, which, when executed by the processor cause the processor to perform operations, the operations comprising: programming, on a page basis, multiple data streams into planes of blocks of the multiple blocks such that data streams of different types are programmed into different blocks of the multiple blocks; generating parity data for data programmed for each page in which data of the multiple data streams is programmed: storing the parity data in the storage device, the storage device configured to hold parity data with the parity data of one or more pages of one type of the different types of data streams overlapped with the parity data of one or more other types of the different types of data streams; and transferring parity contents of the storage device to a non-volatile storage device in response to a determination of occurrence of a transfer criterion.

An example system 2 can include features of example system 1 and can include the operations to include generation of a map of the stored parity data; and transfer of the map as part of the parity contents.

An example system 3 can include features of any of the preceding example systems and can include the map to include identification of parity data overlapped in a storage slot of the storage device.

An example system 4 can include features of any of the preceding example systems and can include the map to include a pointer that identifies, for a respective parity data, a block of the multiple blocks and planes of the block used to generate the respective parity data.

An example system 5 can include features of any of the preceding example systems and can include the operations to include reconstruction of data using the map in response to detection of a failure in programming data.

An example system 6 can include features of any of the preceding example systems and can include frequency of transfer of parity contents for the transfer criterion being adjusted based on a tradeoff condition between performance impact and reconstruction latency.

An example system 7 can include features of any of the preceding example systems and can include the operations to include performance of one or more exclusive-or operations to conduct the overlap of parity data.

An example system 8 can include features of any of the preceding example systems and can include the multiple data streams to include data for single-level cells of memory and data for multi-level cells of memory.

An example system 9 can include features of any of the preceding example systems and can include the multiple data streams to include data for single-level cells of memory or multi-level cells of memory and data for triple-level cells of memory or multi-level cells or quad-level cells of cross point memory or ferroelectric random access memory.

An example system 10 can include features of any of the preceding example systems and can include the transfer criterion to include the storage device entering a power mode or the parity data stored in the storage device reaching a set maximum amount of parity data to store.

An example system 11 can include features of any of the preceding example systems and can include the power mode to include idle time of the non-volatile storage device or a power mode to shut down the storage device.

An example system 12 can include features of any of the preceding example systems and can include the storage device to include a static random access memory device to temporarily cache the data while generating the parity data prior to the transfer of the parity contents.

An example system 13 can include features of any of the preceding example systems and can include the processing device and the one or memory devices being components of a managed NAND memory system and the non-volatile storage device being a NAND device.

An example system 14 can comprise: a processor configured to execute instructions stored one or more components in the system, which, when executed by the processor cause the processor to perform operations, the operations comprising: programming, on a page basis, multiple data streams into planes of blocks of multiple blocks of a memory system such that data streams of different types are programmed into different blocks of the multiple blocks; generating parity data for data programmed for each page in which data of the multiple data streams is programmed; storing the parity data in a storage device with the parity data of one or more pages of one type of the different types of data streams overlapped with the parity data of one or more other types of the different types of data streams; and transferring parity contents of the storage device to a non-volatile storage device in response to a determination of occurrence of a transfer criterion.

An example system 15 can include features of example system 14 and can include the operations to include generation of a map of the stored parity data; and transfer of the map as part of the parity contents.

An example system 16 can include features of any of the preceding example systems 14 and 15 and can include the map to include identification of parity data overlapped in a storage slot of the storage device and a pointer that identifies, for a respective parity data, a block of the multiple blocks and planes of the block used to generate the respective parity data.

An example system 17 can include features of any of the preceding example systems 14-16 and can include the operations to include reconstruction of data using the map in response to detection of a failure in programming data.

An example system 18 can include features of any of the preceding example systems 14-17 and can include the multiple data streams to include data for single-level cells of memory or multi-level cells of memory and data for triple-level cells of memory or multi-level cells or quad-level cells of cross point memory or ferroelectric random access memory.

An example system 19 can include features of any of the preceding example systems 14-18 and can include the transfer criterion to include the non-volatile storage device entering an idle time, the storage device entering a power mode to shut down the storage device, or the parity data stored in the storage device reaching a set maximum amount of parity data to store.

In an example system 20, any of the systems of example systems 1 to 19 may include memory devices incorporated into an electronic system further comprising a host processor and a communication bus extending between the host processor and the memory device.

In an example system 21, any of the systems of example systems 1 to 20 may be modified to include any structure presented in another of example system 1-20.

In an example system 22, any of apparatus of any of the systems of example systems 1 to 21 may further include a machine-readable storage device configured to store instructions as a physical state, wherein the instructions may be used to perform one or more operations of the apparatus.

In an example system 23, any of the systems of example systems 1 to 22 may be adapted and operated to perform operations in accordance with any of the methods of example methods 1-8.

An example method 1 can comprise: programming, on a page basis, multiple data streams into planes of blocks of multiple blocks of a memory system such that data streams of different types are programmed into different blocks of the multiple blocks: generating parity data for data programmed for each page in which data of the multiple data streams is programmed; storing the parity data in a storage device with the parity data of one or more pages of one type of the different types of data streams overlapped with the parity data of one or more other types of the different types of data streams; and transferring parity contents of the storage device to a non-volatile storage device in response to a determination of occurrence of a transfer criterion.

An example method 2 can include features of example method 1 and can include generating a map of the stored parity data; and transferring the map as part of the parity contents.

An example method 3 can include features of any of the preceding example methods and can include generating the map to include generating identification of parity data overlapped in a storage slot of the storage device and generating a pointer that identifies, for a respective parity data, a block of the multiple blocks and planes of the block used to generate the respective parity data.

An example method 4 can include features of any of the preceding example methods and can include reconstructing data using the map in response to detection of a failure in programming data.

An example method 5 can include features of any of the preceding example methods and can include the transfer criterion to include the non-volatile storage device entering an idle time, the storage device entering a power mode to shut down the storage device, or the parity data stored in the storage device reaching a set maximum amount of parity data to store.

In an example method 6, any of the example methods 1-5 may be performed by an electronic system including a host processor and a communications interface extending between the host processor and a memory device.

In an example method 7, any of the example methods 1-6 may be modified to include operations set forth in any other of method examples 1-6.

In an example method 8, any of the example methods 1-7 may be implemented at least in part through use of instructions stored as a physical state in one or more machine readable storage devices.

An example method 9 can include features of any of the preceding example methods 1-8 and can include performing functions associated with any features of example systems 1-22.

An example machine-readable storage device 1 storing instructions, that when executed by one or more processors, cause a machine to perform operations, can comprise instructions to perform functions associated with any features of example systems 1-23 or perform methods associated with any features of example methods 1-9.

In various examples, the components, controllers, processors, units, engines, or tables described herein can include, among other things, physical circuitry or firmware stored on a physical device. As used herein, "processor device" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming." and can include both writing to or erasing from the memory cell (e.g., the memory cell may be programmed to an erased state).

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, RAMs, ROMs, solid state drives SSDs, UFS devices, embedded eMMC devices, and the like.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Thus, the following claims are hereby incorporated into the Detailed Description, with each claim standing on its own as a separate embodiment.

What is claimed is:

1. A system comprising:
    one or more memory devices, each memory device including an array of memory cells organized into one or more planes, the one or more memory devices organized into multiple blocks;
    a storage device separate from the one or more memory devices; and
    the system comprising a processor configured to execute instructions stored on one or more components in the system, which, when executed by the processor cause the processor to perform operations, the operations comprising:
        programming, on a page basis, multiple data streams into planes of blocks of the multiple blocks such that data streams of different types are programmed into different blocks of the multiple blocks;
        generating parity data for data programmed for each page in which data of the multiple data streams is programmed;
        storing the parity data in the storage device, the storage device configured to hold parity data with the parity data of one or more pages of one type of the different types of data streams overlapped with the parity data of one or more other types of the different types of data streams; and
        transferring parity contents of the storage device to a non-volatile storage device in response to a determination of occurrence of a transfer criterion.

2. The system of claim 1, wherein the operations include:
    generating a map of the stored parity data; and
    transferring the map as part of the parity contents.

3. The system of claim 2, wherein the map includes identification of the parity data overlapped in a storage slot of the storage device.

4. The system of claim 2, wherein the map includes a pointer that identifies, for a respective parity data, a block of the multiple blocks and planes of the block used to generate the respective parity data.

5. The system of claim 2, wherein the operations include reconstructing data using the map in response to detection of a failure in programming data.

6. The system of claim 1, wherein frequency of transfer of parity contents for the transfer criterion is adjusted based on a tradeoff condition between performance impact and reconstruction latency.

7. The system of claim 1, wherein the operations include performing one or more exclusive-or operations to conduct the overlap of parity data.

8. The system of claim 1, wherein the multiple data streams include data for single-level cells of memory and data for multi-level cells of memory.

9. The system of claim 1, wherein the multiple data streams include data for single-level cells of memory or multi-level cells of memory and data for triple-level cells of memory or multi-level cells or quad-level cells of cross point memory or ferroelectric random access memory.

10. The system of claim 1, wherein the transfer criterion includes the storage device entering a power mode or the parity stored in the storage device reaching a set maximum amount of parity data to store.

11. The system of claim 10, wherein the power mode includes idle time of the non-volatile storage device or a power mode to shut down the storage device.

12. The system of claim 1, wherein the storage device includes a static random access memory device to temporarily cache the data while generating the parity data prior to the transfer of the parity contents.

13. The system of claim 1, wherein the processing device and the one or memory devices are components of a managed NAND memory system and the non-volatile storage device is a NAND device.

14. A system comprising:
a processor configured to execute instructions stored on one or more components in the system, which, when executed by the processor cause the processor to perform operations, the operations comprising:
programming, on a page basis, multiple data streams into planes of blocks of multiple blocks of a memory system such that data streams of different types are programmed into different blocks of the multiple blocks;
generating parity data for data programmed for each page in which data of the multiple data streams is programmed;
storing the parity data in a storage device with the parity data of one or more pages of one type of the different types of data streams overlapped with the parity data of one or more other types of the different types of data streams; and
transferring parity contents of the storage device to a non-volatile storage device in response to a determination of occurrence of a transfer criterion.

15. The system of claim 14, wherein the operations include:
generating a map of the stored parity data; and
transferring the map as part of the parity contents.

16. The system of claim 15, wherein the map includes identification of parity data overlapped in a storage slot of the storage device and a pointer that identifies, for a respective parity, a block of the multiple blocks and planes of the block used to generate the respective parity.

17. The system of claim 15, wherein the operations include reconstructing data using the map in response to detection of a failure in programming data.

18. The system of claim 14, wherein the multiple data streams include data for single-level cells of memory or multi-level cells of memory and data for triple-level cells of memory or multi-level cells or quad-level cells of cross point memory or ferroelectric random access memory.

19. The system of claim 14, wherein the transfer criterion includes the non-volatile storage device entering an idle time, the storage device entering a power mode to shut down the storage device, or the parity data stored in the storage device reaching a set maximum amount of parity data to store.

20. A method comprising:
programming, on a page basis, multiple data streams into planes of blocks of multiple blocks of a memory system such that data streams of different types are programmed into different blocks of the multiple blocks;
generating parity data for data programmed for each page in which data of the multiple data streams is programmed;
storing the parity data in a storage device with the parity data of one or more pages of one type of the different types of data streams overlapped with the parity data of one or more other types of the different types of data streams; and
transferring parity contents of the storage device to a non-volatile storage device in response to a determination of occurrence of a transfer criterion.

21. The method of claim 20, wherein the method includes generating a map of the stored parity data; and
transferring the map as part of the parity contents.

22. The method of claim 21, wherein generating the map includes generating identification of parity data overlapped in a storage slot of the storage device and generating a pointer that identifies, for a respective parity, a block of the multiple blocks and planes of the block used to generate the respective parity.

23. The method of claim 21, wherein the method includes reconstructing data using the map in response to detection of a failure in programming data.

24. The method of claim 20, wherein the transfer criterion includes the non-volatile storage device entering an idle time, the storage device entering a power mode to shut down the storage device, or the parity data stored in the storage device reaching a set maximum amount of parity data to store.

* * * * *